(12) United States Patent
Wang et al.

(10) Patent No.: US 8,968,831 B2
(45) Date of Patent: Mar. 3, 2015

(54) COATED ARTICLES INCLUDING ANTI-FINGERPRINT AND/OR SMUDGE-REDUCING COATINGS, AND/OR METHODS OF MAKING THE SAME

(75) Inventors: Jiangping Wang, Novi, MI (US); Rudolph H. Petrmichl, Ann Arbor, MI (US); Tiong P. Ong, Austin, TX (US)

(73) Assignee: Guardian Industries Corp., Auburn Hills, MI (US)

( * ) Notice: Subject to any disclaimer, the term of this patent is extended or adjusted under 35 U.S.C. 154(b) by 501 days.

(21) Appl. No.: 13/312,347

(22) Filed: Dec. 6, 2011

(65) Prior Publication Data

US 2013/0142994 A1    Jun. 6, 2013

(51) Int. Cl.
| | |
|---|---|
| B05D 5/02 | (2006.01) |
| B05D 3/00 | (2006.01) |
| B05D 3/04 | (2006.01) |
| B05D 3/06 | (2006.01) |
| B05D 3/10 | (2006.01) |
| B05D 3/12 | (2006.01) |

(52) U.S. Cl.
CPC .. *B05D 5/02* (2013.01); *B05D 3/12* (2013.01); *B05D 3/10* (2013.01); *B05D 3/06* (2013.01)
USPC ............................ 427/307; 427/299; 427/309

(58) Field of Classification Search
CPC ....................................................... B05D 5/02
USPC .......................................... 427/299, 307, 309
See application file for complete search history.

(56) References Cited

U.S. PATENT DOCUMENTS

| | | | | |
|---|---|---|---|---|
| 5,880,552 | A * | 3/1999 | McGill et al. | 310/313 R |
| 6,284,377 | B1 * | 9/2001 | Veerasamy | 428/408 |
| 6,338,901 | B1 | 1/2002 | Veerasamy | |
| 6,395,333 | B2 | 5/2002 | Veerasamy | |
| 6,592,992 | B2 | 7/2003 | Veerasamy | |
| 6,743,516 | B2 | 6/2004 | Murphy et al. | |
| 6,793,979 | B2 | 9/2004 | Veerasamy | |
| 6,796,146 | B2 | 9/2004 | Burnham | |
| 7,763,678 | B2 | 7/2010 | Yamaya et al. | |
| 7,767,253 | B2 | 8/2010 | Sharma | |
| 2006/0081643 | A1 * | 4/2006 | Haluzak et al. | 222/52 |
| 2008/0145631 | A1 * | 6/2008 | Bhate et al. | 428/220 |
| 2008/0185041 | A1 | 8/2008 | Sharma et al. | |
| 2008/0271782 | A1 | 11/2008 | Sharma | |
| 2008/0296260 | A1 | 12/2008 | Tserepi et al. | |
| 2011/0148268 | A1 * | 6/2011 | Driver et al. | 312/408 |

* cited by examiner

*Primary Examiner* — Michael Cleveland
*Assistant Examiner* — James M Mellott
(74) *Attorney, Agent, or Firm* — Nixon & Vanderhye P.C.

(57) ABSTRACT

Certain example embodiments of this invention relate to coated articles including anti-fingerprint and/or smudge-reducing coatings, and/or methods of making the same. Oil from fingerprints and the like may easily transfer to the surface of an article. However, it has been found that in certain example embodiments, a reduced-smudge and reduced-glare effect on a glass substrate may be achieved by micro-engineering a glass surface's properties, such as surface morphology and/or roughness. In certain example embodiments, a thin film coating may be introduced to the glass surface in order to alter the contact angle of the article, or for other optical, electrical, mechanical, chemical and/or environmental purposes and/or durability. It has further advantageously been found that by altering the contact angle of the surface, the anti-smudge and anti-glare effects of the substrate may be further improved.

9 Claims, 6 Drawing Sheets ized, and easier to hold and transport. Touch screens are becoming more common, as well. This combination of increasing the number and transportability of handheld devices, and screens that operate solely or partially by touch, results in the surfaces of these devices being dirtied, smudged, and otherwise impaired due to fingerprints, oils from the skin, lotion, food, and other materials that may be transferred to the surface of the screen of one of these devices by touch and/or by the atmosphere. In some cases, aftermarket screens may be purchased to protect the devices. However, in some instances, it would be advantageous to modify the surface of the article so as to (1) provide better protection from impurities, (2) increase the durability (e.g., scratch resistance) of the article, and/or (3) render aftermarket protection unnecessary. Indeed, such aftermarket films may decrease visible transmission, introduce glare and/or haze, etc., and, as a result, it would be advantageous to reduce the need for them.

COATED ARTICLES INCLUDING ANTI-FINGERPRINT AND/OR SMUDGE-REDUCING COATINGS, AND/OR METHODS OF MAKING THE SAME

Certain example embodiments of this invention relate to coated articles including anti-fingerprint and/or smudge-reducing coatings, and/or methods of making the same. More particularly, example embodiments relate to techniques for achieving anti-fingerprint, reduced-smudge, and/or reduced-glare effects on a glass substrate including micro-engineering a glass surface's properties, such as surface morphology and/or roughness. It has advantageously been found that by altering the hydrophobicity and/or hydrophilicity of the substrate (e.g., through the application of a coating with the desired contact angle with a sessile drop of water), the anti-fingerprint, reduced smudge, and/or anti-glare effects of the substrate may be further increased. In certain example embodiments, a thin coating may be introduced to the glass surface in order to alter the contact angle of the article, or for other optical, electrical, mechanical, chemical and/or environmental purposes and/or durability. Oil from fingerprints and the like may less easily transfer to the surface of the coated articles (e.g., including glass, plastic, and/or the like) of certain example embodiments.

BACKGROUND AND SUMMARY OF CERTAIN EXAMPLE EMBODIMENTS

Manufacturers of consumer electronic devices such as mobile phones, laptops, and the like are turning to glass as a material of choice for device covers (e.g., for the display, etc.). The surfaces of these devices may be smudged with fingerprints and other materials from normal use. Therefore, it may be desirable in certain example embodiments to find a way to make the smudges less noticeable and/or make the surfaces of these devices easier to clean. One skilled in the art would recognize that there is a need for improved device covers/surfaces that are easier to keep clean.

In certain example embodiments, a coating may be applied to facilitate the removal of oils and smudges (e.g., a hydrophobic coating). In other example embodiments, the surface morphology and/or roughness of the glass or plastic-based surface may be altered so as to "hide" impurities and/or residue that remains on the surface of the device. A coating may be applied to further assist in the hiding (e.g., absorption) of the oil, impurities, and/or residue.

In certain example embodiments of this invention, a method of making a smudge-resistant coated article is provided. A major surface of a glass substrate is roughened. A substantially conformal coating is disposed over the major surface of the substrate. An RMS roughness of the major surface of the coated article is less than or equal to about 0.8 microns. The RMS roughness of the roughened major surface of the substrate differs from the RMS roughness of the coated article by no more than about 0.2 microns.

In certain example embodiments of this invention, there is provided a coated article, comprising a substrate having a roughened major surface; and a thin film coating disposed over the roughened surface of the substrate. The coating is substantially conformal to the features of the roughened major surface of the substrate, such that a major surface of the coated article comprises an RMS roughness value of less than or equal to 0.8 microns.

In certain example embodiments of this invention, a coated article is provided. A thin film coating is disposed on a substrate, with the coating comprising a roughened major surface having peaks and valleys with an overall RMS roughness value of less than or equal to 0.8 microns. The thin film coating has a surface energy sufficient to cause at least some oils that come into contact therewith to migrate into valleys of the thin film coating.

BRIEF DESCRIPTION OF THE DRAWINGS

FIG. 1 is a plan view of an example untreated, unmodified glass substrate susceptible to fingerprints and the like;

FIG. 3(*b*) illustrates a glass substrate comprising a coating comprising a modified surface according to certain example embodiments;

DETAILED DESCRIPTION OF CERTAIN EXAMPLE EMBODIMENTS

Figure 1:
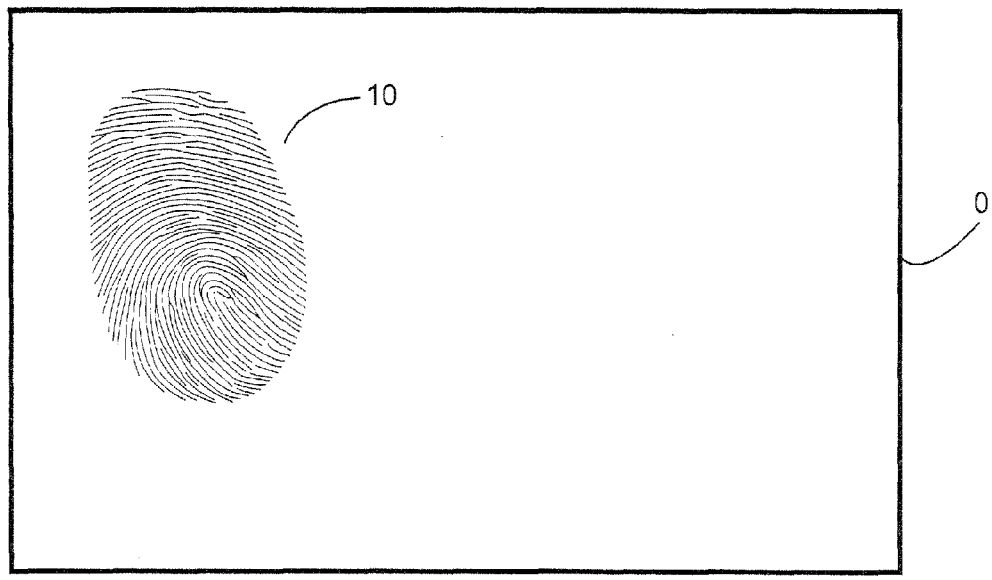

Glass and plastic substrates are being used more often in handheld applications, particularly handheld electronic applications. Telephones, mobile phones, computer and TV display screens, tablets, laptops, handheld video games, music players, and the like, are being made smaller, and easier to hold and transport. Touch screens are becoming more common, as well. This combination of increasing the number and transportability of handheld devices, and screens that operate solely or partially by touch, results in the surfaces of these devices being dirtied, smudged, and otherwise impaired due to fingerprints, oils from the skin, lotion, food, and other materials that may be transferred to the surface of the screen of one of these devices by touch and/or by the atmosphere. In some cases, aftermarket screens may be purchased to protect the devices. However, in some instances, it would be advantageous to modify the surface of the article so as to (1) provide better protection from impurities, (2) increase the durability (e.g., scratch resistance) of the article, and/or (3) render aftermarket protection unnecessary. Indeed, such aftermarket films may decrease visible transmission, introduce glare and/or haze, etc., and, as a result, it would be advantageous to reduce the need for them.

Referring now more particularly to the accompanying drawings in which like reference numerals indicate like elements throughout the accompanying views.

FIG. 1 illustrates untreated glass substrates 0 with fingerprint 10. As can be seen from FIG. 1, a single fingerprint may create an unsatisfactory aesthetic appearance of substrate 0 and/or obscure information that is intended to be visible therethrough. Accordingly, an article comprising an improved surface may be desirable, so as to improve the overall aesthetic appearance of the article.

Certain embodiments described herein relate to improving anti-fingerprint, anti-smudge, and/or anti-glare effects of substrates by altering the surface morphology of the substrate and/or a coating disposed thereon, e.g., by providing a degree of surface roughness sufficient for reducing visible fingerprints, impurities, and/or residue on the surface of said articles.

In certain example embodiments, it has advantageously been found that by increasing the surface roughness of an article (e.g., by patterning/roughening the surface of the substrate and/or that of a coating disposed thereon), the visible impurities on or near the surface of the article may be reduced, without the need for an aftermarket protective coating. In certain example embodiments, the impurities may be reduced by making it easier to remove said impurities from the surface, and in other embodiments, the impurities may be reduced by being absorbed into the valleys of the roughened surface.

Figure 2:
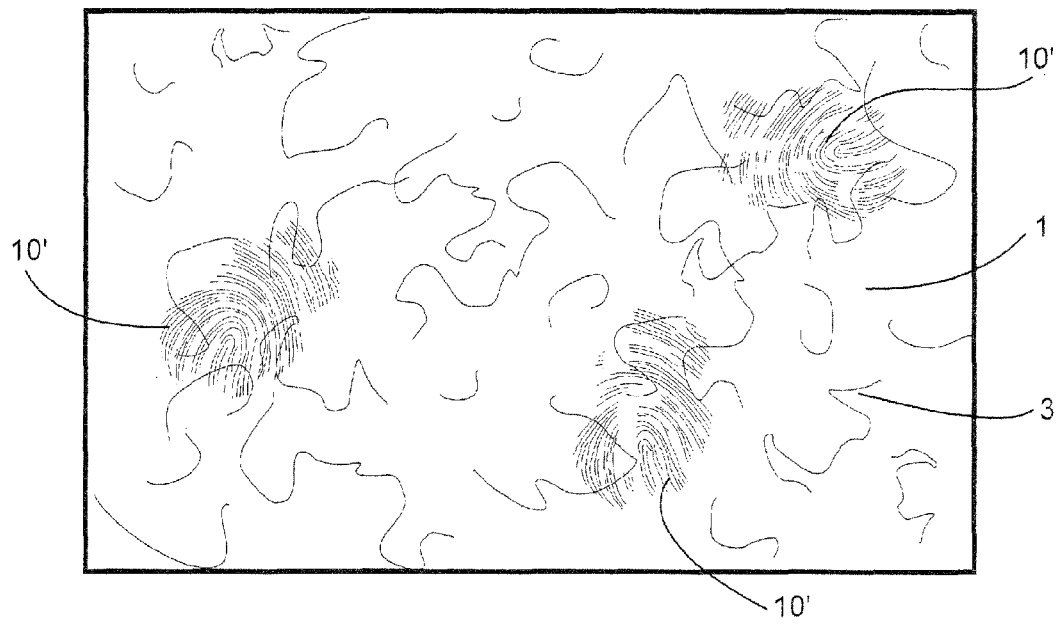
FIG. 2 is a plan view of a glass substrate with a modified surface according to certain example embodiments.

FIG. 2 illustrates treated glass substrate 1 with modified outermost surface 3 and faint fingerprint(s) 10'. It can be seen from FIG. 2 that when an article comprises a modified surface 3, the fingerprint or other impurity may be more difficult to see. In other example embodiments, the surface modifications may render it easier to clean the surface, which will also improve the appearance of the surface (e.g., after it has been simply wiped down, etc.). In certain example embodiments, the outermost surface 3 may be a surface of the substrate itself. However, in other example embodiments where a thin film is provided over a surface of the substrate, the outermost surface 3 of the coated article may be an outermost surface of the thin film.

It has been advantageously found that in certain example embodiments, a reduced-fingerprint, reduced-smudge and/or reduced-glare effect on a substrate may be achieved by micro-engineering a surface thereof, e.g., to change surface morphology and/or roughness. It has further advantageously been found that by altering the hydrophobicity and/or hydrophilicity of the surface (e.g., through the application of a coating with the desired contact angle with a sessile drop of water), the reduced-fingerprint, reduced-smudge, and/or reduced-glare effects of may be further increased.

Furthermore, in certain example embodiments, it has been found that at least in part due to the features (e.g., peaks and valleys) of the modified outermost surface 3, the article may also advantageously scatter light and produce an anti-glare/anti-reflection effect.

In certain example embodiments, a thin coating may be introduced to the glass surface in order to alter the contact angle of the article, and/or for other optical, electrical, mechanical, chemical, and/or environmental purposes, and/or durability.

In certain examples, the thin coating may serve other purposes. It has been found that in some embodiments, disposing a coating over a substrate with a micro-engineered surface may impart additional advantages and/or improved properties to the article. For example, the coating may provide additional protection to sharp features generated during the surface modification of the substrate. In other embodiments, a coating disposed over the modified surface may improve smudge- and/or fingerprint-reducing effects by tuning the contact angle of the coated article's surface. The coating may further improve the scratch resistance, durability, anti-reflection properties, and/or anti-microbial properties of the article, in certain example embodiments, Furthermore, the material for the coating may be selected based on which improved and/or advantageous properties are desired, based at least in part on the final application of the coated article.

In other example embodiments, modifying a substrate's surface itself may not sufficiently generate the desired feature shape, type, and/or size. In situations such as those, it may be advantageous to dispose a coating over the substrate, such that the coating may be micro-engineered itself to produce the desired feature shape, type, and/or size.

Figure 3A:
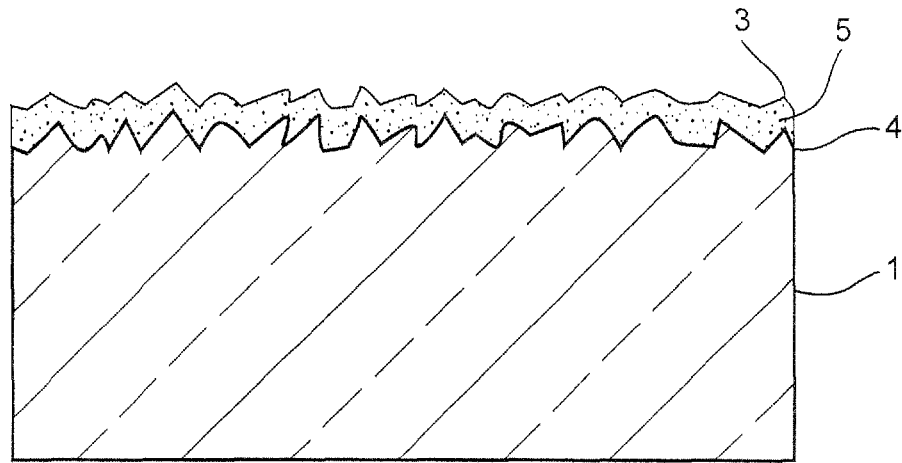
FIG. 3(*a*) illustrates a glass substrate comprising a modified surface and an optional conformal coating according to certain example embodiments.

FIG. 3(a) illustrates substrate 1 with modified (e.g. micro-engineered) surface 4 and optional conformal coating 5. In certain example embodiments, substrate 1 may be a glass substrate. However, in other example embodiments, substrate 1 may be of or include plastic, or another suitable material.

In certain example embodiments, it has advantageously been found that by modifying the surface properties of substrate 1, reduced-fingerprint, reduced-smudge, and/or reduced-glare effects may be realized. It has been found that by micro-engineering the surface of a substrate to a certain level (e.g., a particular range of roughness, haze, and/or clarity), may advantageously achieve reduced smudging (e.g., from fingerprints, other materials transmissible via touch, and/or other impurities and the like) and/or a reduced glare.

In certain example embodiments, it has been found that a surface roughness (e.g., the root mean square "RMS" roughness) may advantageously be less than about 2 microns, more preferably less than about 1.2 microns, even more preferably less than about 0.8 microns, and in certain exemplary embodiments, less than or equal to about 0.6 microns. In certain examples, the average peak to peak distance, and average peak to valley height, may be values sufficient to arrive at the desired RMS roughness.

RMS roughness is known, and is typically quantified in nm (although herein reported in microns as indicated above). The RMS roughness of a surface may be measured in accordance with the ISO/DIS 25178-2 or ASME B46.1 standards.

In certain example embodiments, by modifying the surface of the substrate (e.g., micro-engineering the surface such that it is patterned, textured, roughened, etc.), an improved haze value may be obtained. As is known, light diffused in many directions can cause a loss in contrast. The term "haze" is defined herein in accordance with ASTM D 1003, which defines haze as that percentage of light which in passing through deviates from the incident beam greater than 2.5 degrees on the average. "Haze" may be measured herein by a Byk Gardner haze meter (all haze values herein are measured by such a haze meter and are given as a percentage of light scattered).

In certain example embodiments, the haze may advantageously be less than about 50, more preferably less than about 40, and most preferably from about 20 to 35. However, in certain examples, the haze may be lower than about 20. These haze values may be obtained before and/or after any optional heat treatment of the article.

In certain example embodiments, the surface of the substrate may be modified by etching the surface. More specifically, in certain examples, the surface of the substrate may be etched with HF, HCl, $H_2SO_4$, and/or any other acid and/or base suitable for etching. The substrate may be acid-etched on one or more major surfaces. In certain example embodiments, etching at least one surface of the substrate may advantageously keep haze low and visibility high. In further examples, visible transmission and UV transmission may be particularly high.

In other example embodiments, the surface of the substrate may be modified with a laser. In certain examples, a YAG, a $CO_2$, and/or Excimer laser may be used for the surface modification. In certain example embodiments, the laser may scan over the surface in a pre-determined pattern, a random pattern, and/or a pseudo-random pattern to create the appropriate features. A programmed fractal-based pattern may be used in certain example embodiments.

In further example embodiments, the surface of substrate 1 may be modified (e.g., micro-engineered) by other methods for etching, texturing, patterning, and the like. For example, the substrate may be modified by glass patterning, or methods of patterning plastic substrates (when the substrate is not of or including glass), ion beam milling/treatment, bead blasting, etc.

In certain example embodiments, coating 5 may be deposited via chemical vapor deposition (CVD), physical vapor deposition (PVD) such as sputtering, ion-beam assisted deposition (IBAD), etc. In other example embodiments, coating 5 may be deposited via wet coating processes (e.g., sol gel techniques), such as those described in U.S. Pat. No. 7,767,253, and U.S. Patent Publication Nos. 2008/0185041 and 2008/0271782, all of which are hereby incorporated by reference. Thus, in certain example embodiments, coating 5 may be deposited via any technique that produces a substantially conformal coating over modified (e.g., micro-engineered, roughened, patterned, textured, etc.) surface 4, so as to maintain or substantially and/or partially maintain the RMS roughness of surface 4. Preferably, the coating will alter the RMS roughness by no more than 0.3, more preferably by no more than 0.2, and still more preferably by no more than about 0.1.

In certain example embodiments, an exemplary method of disposing a substantially conformal coating over modified surface 4 may comprise high-pressure CVD. In certain cases, the substrate with the modified surface may be partially or substantially immersed in a cloud of coating material, in a high-pressure environment. Due to a lack of direction (e.g., as in sputtering), this method may enable the coating material to form a substantially conformal coating over the modified surface 4. In other example embodiments, coating 5 may be deposited via high-pressure ion-assisted sputtering (e.g., IBAD). In further example embodiments, any method of depositing coating 5 that results in a partially and/or substantially conformal coating may be used.

Figure 3B:
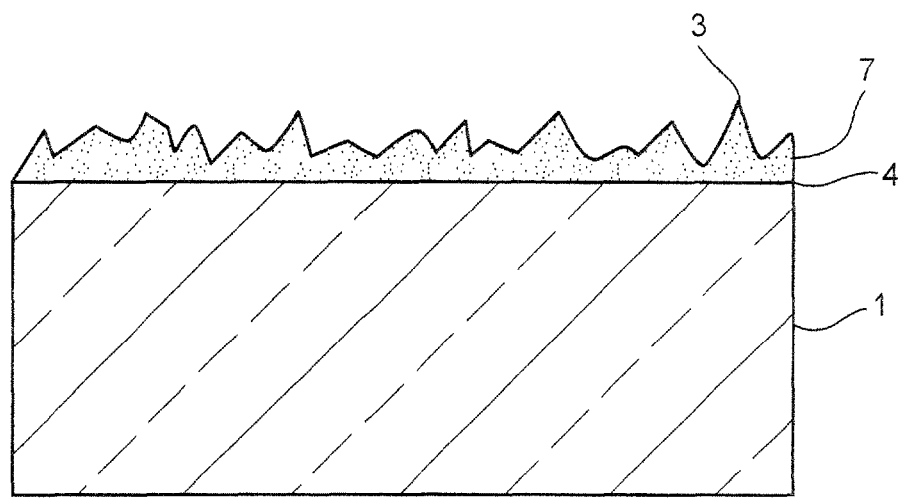

FIG. 3(b) illustrates glass substrate 1 with modified (e.g., micro-engineered) coating 7. The FIG. 3(b) example embodiment differs from the FIG. 3(a) example embodiment in that the surface of the substrate 1 has not been modified in FIG. 3(b). Instead, as explained in greater detail below, the coating 7 provides the desired roughness in the FIG. 3(b) example embodiment.

In certain example embodiments, it may be desirable to micro-engineer the surface of a coating, rather than or in addition to modifying the surface of the substrate, e.g., in order to produce the desired feature shape, type, and/or size. It has advantageously been found reduced-fingerprint, reduced-smudge, and/or reduced-glare effects may also be realized by modifying the surface properties of a coating 7 deposited on substrate 1. It has been found that by micro-engineering a coating (e.g., disposed on a substrate) to a certain level (e.g., a particular range of roughness, haze, and/or clarity), may also achieve reduced smudging (e.g., from fingerprints, other materials transmissible via touch, and/or other impurities and the like) and/or a reduced glare.

The coating 7 may have a surface roughness (e.g., the root mean square "RMS" roughness) that is the same as or similar to the values presented above for the surface of the substrate 1. For example, the coating 7 may have an RMS roughness less than about 2 microns, more preferably less than about 1.2 microns, even more preferably less than about 0.8 microns, and in certain exemplary embodiments, less than or equal to about 0.6 microns. In certain examples, the average peak to peak distance, and average peak to valley height, may be values sufficient to arrive at the desired RMS roughness.

In certain example embodiments, by modifying the surface of a coating 7 disposed on a substrate (e.g., micro-engineering the surface of the coating such that it is patterned, textured, roughened, etc.), an improved haze value may be obtained.

In certain example embodiments, the haze of the coated article may advantageously be less than about 50, more preferably less than about 40, and most preferably from about 20 to 35. However, in certain examples, the haze may be lower than about 20. These haze values may be obtained before and/or after any optional heat treatment of the article.

In certain example embodiments, coating 7 may be roughened, patterned, textured, etc., as it is deposited. In other example embodiments, coating 7 may be deposited as a substantially flat and continuous manner across the substrate, and may be patterned, textured, etched, and/or the like after deposition.

In certain example embodiments, coating 7 may be deposited via CVD, PVD, IBAD, wet coating processes (e.g., sol gel and the like), and/or any other methods suitable for depositing a coating. If coating 7 is not roughened, textured, patterned, or the like, as it is deposited, coating 7 may be micro-engineered so as to have a desired surface roughness post-deposition.

Figure 4:
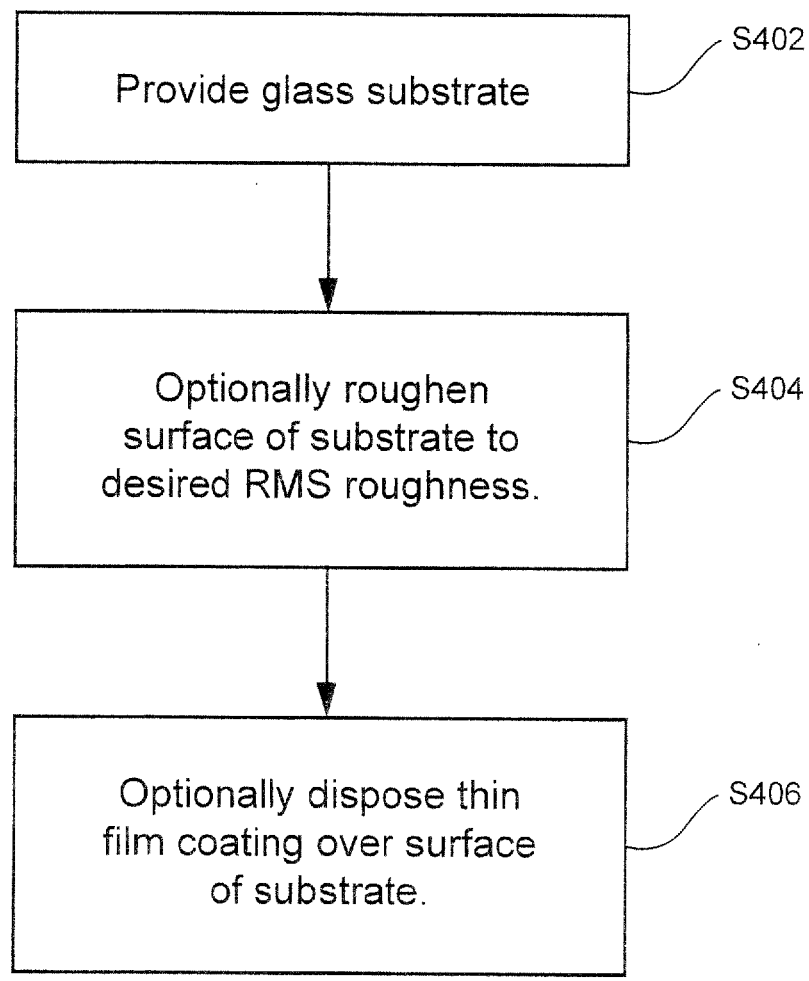
FIG. 4 is a flowchart illustrating processes that may be used in connection with certain example embodiments.

FIG. 4 is a flowchart illustrating processes that may be used in connection with certain example embodiments. A glass substrate is provided (step S402). The surface of the substrate optionally is roughened to a desired RMS surface roughness (step S404). As indicated above, the roughness may be created via single or multi-agent etchants (e.g., acid-based etchants), by scanning the surface with a laser, via bead blasting, and/or the like. A thin film coating optionally may be disposed over the surface of the substrate (step S406). This thin film coating may be highly conformal with respect to the underlying surface, e.g., in cases where the surface of the substrate is optionally roughened. In other cases, however, the thin film coating itself may be textured to the desired surface roughness (e.g., when the surface of the substrate is not roughened at all or to the desired extent). As explained in greater detail below, the thin film coating may have a surface energy that aids in creating anti-fingerprint and/or reduced smudging effects. For instance, the thin film coating may have a surface energy that causes the layer to be hydrophilic or hydrophobic. The coating may in addition or in the alternative serve as an antireflective layer, a protective overcoat (e.g., protecting the underlying micro-engineered surface), and/or an antimicrobial and/or antifungal coating. Further details regarding the surface energy and the synergistic effect between the micro-engineered surfaces are set forth in greater detail below.

In certain example embodiments, it has advantageously been found that regardless of the surface micro-engineering techniques (e.g., regardless of whether the surface 4 of the substrate is modified, or the surface of a coating 7 is modified, to have the desired features), the modified surface 3 of the article may advantageously have a surface energy and/or contact angle tailored to a particular range so as to reduce any smudging effects, etc.

Figure 5B:
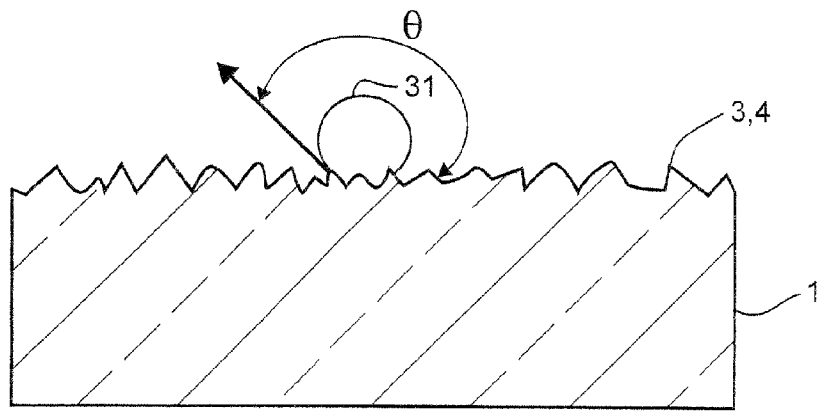

In certain example embodiments, hydrophobic and/or hydrophilic performance of modified surface 3 may be a function of contact angle theta, surface energy gamma, and wettability or adhesion energy W. The surface energy of modified outermost surface 3 or any other surface may be calculated by measuring its contact angle theta. Various examples of contact angle theta are illustrated in FIGS. 5(b), 6(b), and 7(b). The coatings and/or surface modifications are not shown in these figures for purposes of simplicity.

To measure contact angle, a sessile drop 31 of a liquid such as water is placed on the substrate as shown in FIGS. 5(b), 6(b), and 7(b). A contact angle theta between the drop 31 and the underlying article appears, defining an angle theta, depending upon the interface tension between the three phases at the point of contact. The contact angle is greater in FIGS. 5(b) and 7(b) than in FIG. 6(b) because of the surface energy of the respective surfaces.

Figure 5A:
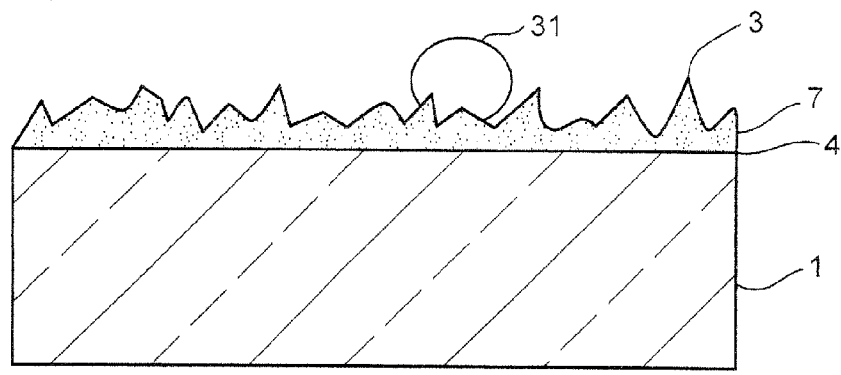
FIGS. 5(*a*) to 5(*c*) illustrate an article comprising a hydrophobic surface according to certain example embodiments.
Figure 5C:
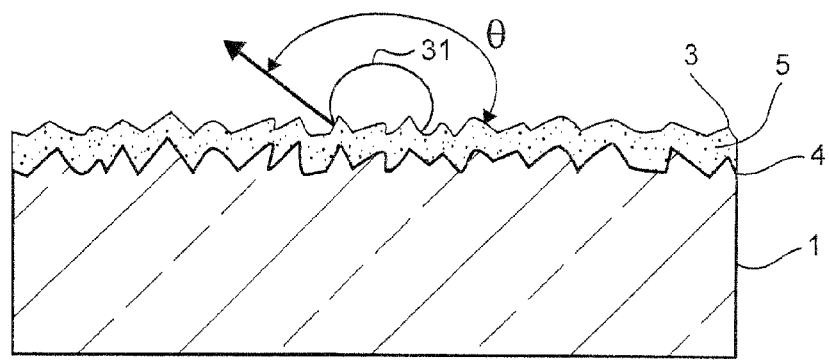

FIG. 5(a) illustrates glass substrate 1 supporting coating 7. The coating 7 is hydrophobic. Thus, the outermost surface 3 of the coated article also is hydrophobic. FIG. 5(b) illustrates the high contact angle theta for the substrate 1 alone, e.g., absent a separate coating 5 or 7. FIG. 5(c) illustrates the high contact angle theta for an embodiment that includes a roughened surface 4 of the substrate 1 as well as a conformal layer 5 disposed thereon.

In certain example embodiments, e.g., as shown in FIG. 5(a)-(c), the outermost surface 3 may be hydrophobic. The outermost surface 3 may be modified by: micro-engineering the surface of a coating 7 disposed on substrate 1 as shown in FIG. 5(a); micro-engineering the surface of the substrate alone (e.g., creating the modified substrate surface 4) as in FIG. 5(b), (2); and/or providing a conformal coating 5 over a micro-engineered surface 4 of the substrate. When the surface of the substrate is modified, the optional conformal coating 5 may or may not be disposed on modified substrate surface 4, according to difference example embodiments.

Whether a coating is disposed conformally on a roughened substrate, or the coating is patterned itself, or no coating is used, in certain example embodiments, it may be desirable to reduce the surface energy of the surface of the substrate or coated article so as to achieve a higher contact angle theta.

When the outermost surface 3 is hydrophobic, the high contact angle may facilitate removal (e.g., wiping off) of impurities from oils, skin, and other materials that came into contact with surface 3, for example, as compared to situations in which the outermost surface 3 is not hydrophobic. Because of the higher contact angle, the impurities will not be as attracted to modified surface 3, and may remain on the surface—rendering impurities easier to remove, in certain example embodiments. The hydrophobicity of modified surface 3 may be related to the surface energy change arising from the features themselves (e.g., the peaks and valleys) micro-engineered in the surface of the substrate and/or coating.

In certain example embodiments, the contact angle of the outermost surface 3 may be at least about 75 degrees, more preferably at least about 95 degrees, and most preferably at least about 100, in cases where a hydrophobic outermost surface 3 is desired.

In certain example embodiments, when a hydrophobic surface is desired, coating(s) 5 and/or 7 may advantageously include layers comprising tantalum nitride, other tantalum-based compounds, NiCrOx, hydrophobic DLC, and/or ZrOx. In further example embodiments, the coating may further comprise zinc, silver, copper, titanium, and/or the like. The inclusion of such materials may impart antibacterial and/or antifungal properties to the coating 5 and/or 7 disposed on the substrate 1. In certain example embodiments, coating(s) 5 and/or 7 may also help protect the features of the modified surface of the substrate from damage. This may in some cases also help to preserve the desired contact angle. In certain cases, other properties of the article may also be improved by virtue of the presence of the coating(s) 5 and/or 7.

For example, when hydrophobic DLC and/or a zirconium-based compound is used, the durability and/or scratch resistance of the article may be improved. Furthermore, when coatings) 5 and/or 7 are of or include a zirconium oxide-based compound that further comprises, zinc, silver, copper, or the like, the article may be rendered anti-microbial, in addition to being hydrophobic. Furthermore, when coating(s) 5 and/or 7 are of or include silicon nitride, silicon oxide, and/or silicon oxynitride, in addition to improved durability and/or scratch resistance, the article may also be an antireflective coating. In certain example embodiments, one or more layers may be provided over the substrate 1 to achieve these properties, regardless of whether the surface of the substrate is textured. For example, a hydrophobic silicon-inclusive layer may be provided over and contacting the substrate 1 and a zirconium-based layer may be provided over the silicon-inclusive layer for durability purposes. The zirconium-based layer may be deposited as ZrN and converted to ZrOx as a result of heat treatment. Moreover, the zirconium-based layer may be doped with Zn, Ag, Cu, Ti, and/or the like to provide antimicrobial properties. The coatings may be thin and conformal to one another and/or the underlying surface of the substrate (e.g., when it is itself roughened) and provide the hydrophobic effects discussed herein.

Figure 6A:
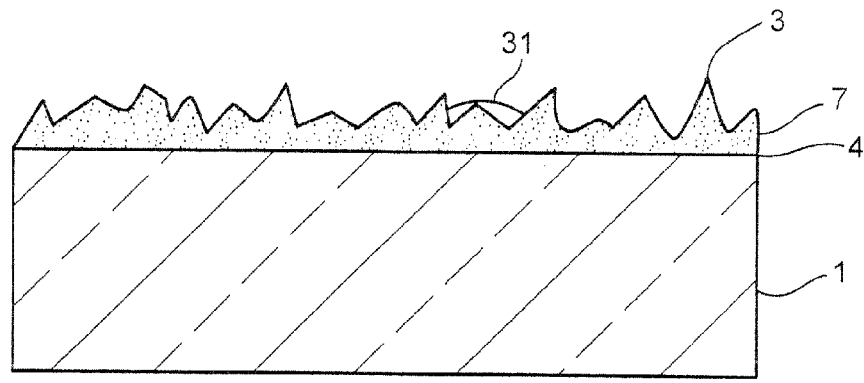
FIGS. 6(*a*) to 6(*c*) illustrate an article comprising a hydrophilic surface according to certain example embodiments.
Figure 6B:
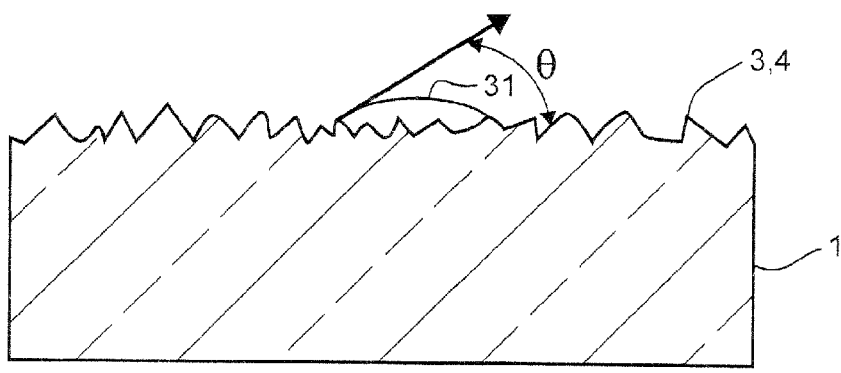

FIG. 6(a) illustrates glass substrate 1, with an outermost surface 3 that is hydrophilic (e.g., as can be seen with reference to the sessile drop of water 31 and the corresponding angle theta). As shown in FIG. 6(a), the substrate 1 has a surface 4 that is unmodified and, instead, the coating 7 disposed thereon includes the desired surface roughness and imparts the desired surface energy corresponding to the hydrophilic properties.

Figure 6C:
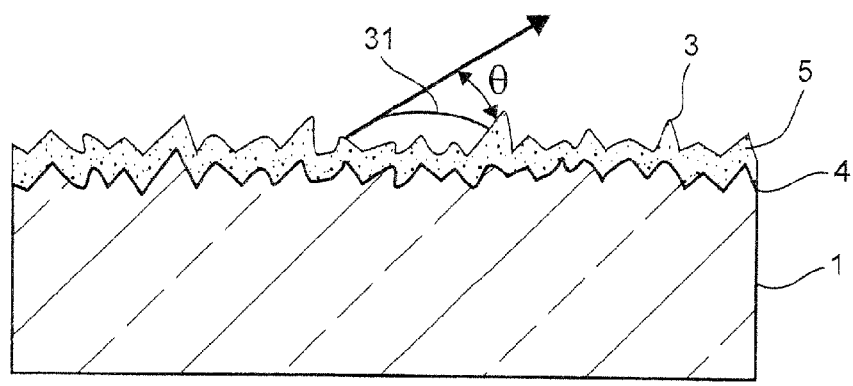

FIG. 6(b) illustrates the glass substrate 1 having a roughened surface 4 that provides the low contact angle theta and, thus, provides a hydrophilic outermost surface 3. FIG. 6(c) includes a glass substrate 1 having a roughened surface 4 supporting a conformal coating 5. The conformal coating also has a low contact angle theta and therefore provides a hydrophilic outermost surface 3.

Whether a coating is disposed conformally on a roughened substrate, or the coating is patterned itself, or no coating is used and the substrate itself is patterned, in certain example embodiments it may be desirable to raise the surface energy of the surface of the article (e.g., substrate and/or coated article) so as to achieve a lower contact angle theta and thus provide the desired hydrophilic properties.

In certain example embodiments, the outermost surface 3 may be rendered hydrophilic. In these cases, because fo the lower contact angle, impurities from oils, skin, and other materials that came into contact with hydrophilic surface may be "absorbed" into the valleys of the micro-engineered (e.g., patterned, textured, etched, etc.) surface 3. The movement of the impurities may be facilitated by virtue of the hydrophilic nature of the outermost surface 3. Because of the lower contact angle, the impurities are more attracted to modified surface 3, and may fall into the valleys—rendering impurities less visible, in certain example embodiments.

In certain example embodiments, the contact angle of the modified surface 3 may be less than about 25 degrees, more preferably less than about 20 degrees, and most preferably less than about 15 degrees.

In certain example embodiments, when the outermost surface 3 is hydrophilic, coating(s) 5 and/or 7 may advantageously be of or include hydrophilic DLC, anatase $TiO_2$, porous silica, other silane-based compounds, and/or other compounds that contain polar or charged functional groups. In certain cases, other properties of the article may also be improved because of coating(s) 5 and/or 7. See, for instance, the description provided above.

In other example embodiments, e.g., when hydrophilic DLC and/or a silica-based compound is/are used, the durability and/or scratch resistance of the article may be improved, similar to as described above. Furthermore, when coating(s) 5 and/or 7 are of or include silica-based compounds, e.g., silicon nitride, silicon oxide, and/or silicon oxynitride, in addition to improved durability and/or scratch resistance, the article may also experience anti-reflection effects in addition to those resulting from scattering of light due to the patterned, textured, etched, etc., modified surface 3.

Figure 7A:
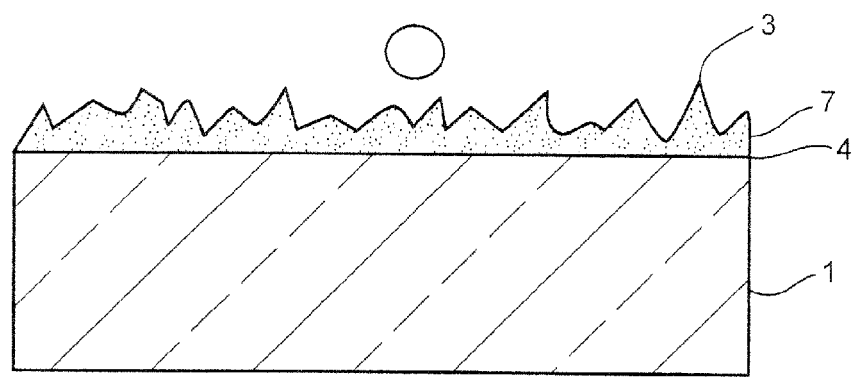
FIGS. 7(*a*) to 7(*c*) illustrate an article comprising a super hydrophobic surface according to certain example embodiments.
Figure 7B:
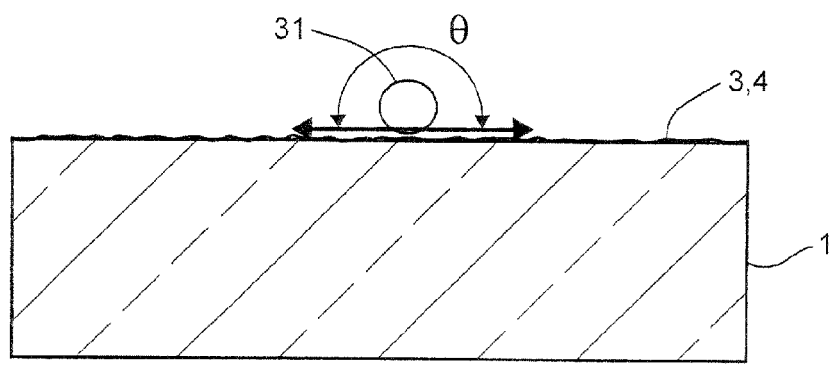
Figure 7C:
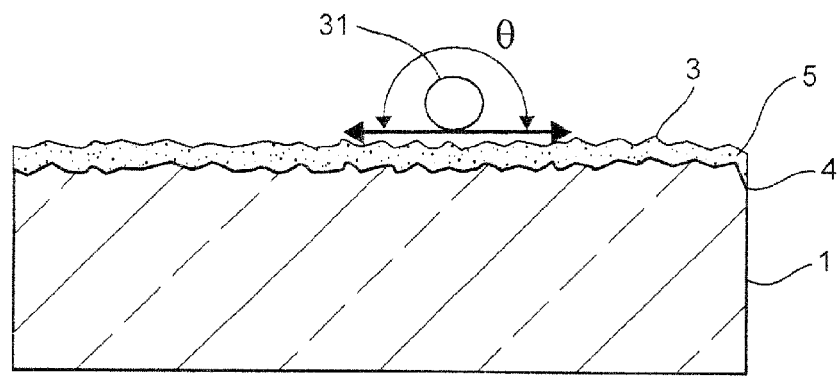

FIG. 7(a) illustrates glass substrate 1, with super hydrophobic outermost surface 3. FIG. 7(a) shows that when super hydrophobic outermost surface 3 has a sufficiently low surface energy and sufficiently high contact angle (e.g., approaching 180 degrees), oil, dirt, and other materials may not even transfer to super hydrophobic surface 3. FIG. 7(b) illustrates the very high (e.g., from above about 100 degrees to values approximately approaching 180 degrees) contact angle theta of the surface 4 of substrate 1 with. In other examples, when the materials contact super hydrophobic outermost surface 3, the impurities may roll and/or fall off of/away from super hydrophobic outermost surface 3. This may advantageously result in an article that does not need to be frequently cleaned and that does not necessarily absorb impurities. In certain examples, a window, windshield, monitor, screen, handheld electronic device, or the like, that has a super hydrophobic surface may advantageously remain substantially clean (e.g., free of impurities such as oil from fingers, food, make up, other materials, and the like) regardless of what impurities come into contact with said modified surface. FIG. 7(c) is similar to the above, except that it includes a substrate 1 with a roughened surface 4 and a conformal coating 5. The outermost surface 3 is still super hydrophobic.

In certain example embodiments, the contact angle of the modified surface 3 may be greater than about 100 degrees, more preferably greater than about 120 degrees, and most preferably at least about 130, or even 150, degrees.

In certain example embodiments, when modified surface 3 is super hydrophobic, coating(s) 5 and/or 7 may advantageously be of or include various nanoparticles mixed with polymers, electrochemical deposition of gold and silver aggregates followed by chemisorption of a monolayer of n-dodecanothiol, electrodeposition of copper combined with lithography or copper wet etching, close-packed polystyrene microsphere topography, casting of polymer solutions under humid conditions, replication of the lotus-leaf structure in PDMS by nanocasting, mechanical assembly of monolayers on elastomeric surfaces and/or a gelation process for polypropylene and tetraethyl orthosilicate mixed with an acrylic polymer.

In further example embodiments, plasma techniques have also been used either to modify the chemistry and the surface morphology of polymeric surfaces, such as polybutadiene and polypropylene to deposit ribbon like randomly distributed microstructures, or to etch an inhomogeneous material, so as to render a coating and/or surface of a coating super hydrophobic. Other example methods for the production of super hydrophobic surfaces have been also based on the formation of densely packed high-aspect-ratio structures such as polymer nanofibres, aligned carbon nanotubes, Si pillars fabricated by photolithography and plasma etching, and/or Si nano-rod arrays fabricated by Si vapor deposition. In certain example embodiments, patterned printing may also be used to achieve a desired surface roughness.

Additionally, depending on the material used to achieve super hydrophobic surface 13, other properties of the article may be improved. For example, the scratch resistance, durability, resistance to microbes, and/or anti-reflection properties of the article may also be improved (in addition to the anti-smudge properties), based in part on what material is used for coating(s) 5 and/or 7.

In certain example embodiments, when coating(s) 5 and/or 7 are of or include silicon nitride and/or silicon oxynitride, the durability and scratch resistance of the article may be improved. Furthermore, the anti-reflection properties of the article may be further improved, as well.

In certain example embodiments, the substrates described herein may be of or include glass, plastic, or other materials suitable for use in handheld electronic devices. However, the applications of these methods and articles are not so limited. Articles as described herein, and methods for making the same, may be advantageously used in windows, buildings, cars, windshields, showers, ovens, refrigerators and/or freezers, photovoltaic devices, solar cells, in addition to handheld and/or electronic devices, according to different example embodiments. Smudge-resistant, scratch-resistant, and/or anti-reflective articles, and methods for making the same, as described herein may have widespread applications.

For some handheld electronic device applications, glass and/or plastic substrates may have a thickness of from about 0.5 to 10 mm, more preferably from about 1 to 5 mm, and in certain example embodiments, the thickness may be from about 1 to 2 mm (e.g., for handheld electronic devices, other electronic devices, and the like). In other applications, the glass may be thicker than the aforesaid ranges (e.g., when used in architectural, automotive, and/or safety applications).

In certain example embodiments, a method of making a smudge-resistant coated article is provided. The method may comprise roughening a major surface of a glass substrate, and disposing a substantially conformal coating over the major surface of the substrate. In certain examples, the RMS roughness of the major surface of the coated article is less than or equal to about 0.8 microns. Moreover, the RMS roughness of the roughened major surface of the substrate may differ from the RMS roughness of the coated article by no more than about 0.2 microns.

In certain example embodiments, a coated article is provided. The coated article comprises a substrate having a roughened major surface, and a thin film coating disposed over the roughened surface of the substrate. The coating is substantially conformal to the features of the roughened major surface of the substrate, such that a major surface of the coated article comprises an RMS roughness value of less than or equal to 0.8 microns.

In certain example embodiments, a coated article is provided. The coated article comprises a thin film coating disposed on a substrate, the coating comprising a roughened major surface having peaks and valleys with an overall RMS roughness value of less than or equal to 0.8 microns. The thin film may have a surface energy sufficient to cause at least some oils that come into contact therewith to migrate into valleys of the thin film coating.

In addition to the features of any of the previous three paragraphs, in certain example embodiments, the major surface of the substrate may be roughened via etching with acid and/or with a laser.

In addition to the features of any of the previous four paragraphs, in certain example embodiments, the substantially conformal coating may be deposited via ion beam assisted deposition, high pressure chemical vapor deposition, and/or sol gel deposition.

In addition to the features of any of the previous five paragraphs, in certain example embodiments, the substantially conformal coating may be hydrophobic. For instance, in certain example embodiments, the hydrophobic coating may comprise DLC, which may be metal- and/or fluorine-doped DLC, or non-doped DLC. In other cases, in place of or in addition to using DLC, certain example embodiments may incorporate zirconium into the substantially conformal hydrophobic coating. The zirconium may in some cases be doped with Ag, Cu, and/or Ti, or left un-doped. In certain example embodiments, the hydrophobic coating may have a contact angle of at least about 75 degrees.

In addition to the features of any of the previous five paragraphs before the immediately preceding paragraph, in certain example embodiments, the substantially conformal coating may be hydrophilic. In certain example embodiments, the hydrophilic coating may comprise any of anatase TiOx and/or porous silica. In certain example embodiments, the hydrophilic coating may have a contact angle of less than or equal to about 20 degrees.

In addition to the features of any of the previous five paragraphs before the two immediately preceding paragraphs, in certain example embodiments, the substantially conformal coating may be super hydrophobic. In certain example embodiments, super hydrophobic coating may have a contact angle of at least about 100 degrees, or even at least about 120 degrees.

In addition to the features of any of the previous eight paragraphs, in certain example embodiments, the RMS roughness of the major surface of the coated article is less than or equal to about 0.6 microns.

In addition to the features of any of the previous paragraphs, in certain example embodiments, the substantially conformal coating comprises silicon nitride and/or silicon oxynitride.

In certain example embodiments, the articles described herein may be heat treated (e.g., thermally tempered, heat strengthened, cured, etc.). In other examples, the articles may not be heat treated. In some embodiments, the articles may be strengthened by other means (e.g., chemical strengthening). In embodiments where the substrates are of or include glass, the glass substrate may be soda lime silica, borosilicate glass, silicate glass, low iron-high transmission glass, and any other types of appropriate glass.

In certain example embodiments, before and/or after any heat treatment steps, the visible transmission of articles described herein may be at least about 70%, more preferably at least about 80%, or even about 85-90%, and in some cases the visible transmission may be even higher. However, in other example embodiments, the visible transmission may be lower. For example, if the article is to be used as a shower door, or some sort of privacy window, the article may have a matte finish and may have a lower visible transmission.

The terms "heat treatment" and "heat treating" as used herein mean heating the article to a temperature sufficient to enabling thermal tempering, bending, or heat strengthening of the glass inclusive article. This definition includes, for example, heating a coated article to a temperature of at least about 580 degrees C. for a sufficient period to enable tempering. In some instances, the HT may be for at least about 4 or 5 minutes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a smudge-resistant coated article, the method comprising:
    roughening a major surface of a glass substrate; and
    disposing a substantially conformal coating over the major surface of the substrate;
    wherein an RMS roughness of the major surface of the coated article is less than or equal to about 0.8 microns,
    wherein the RMS roughness of the roughened major surface of the substrate differs from the RMS roughness of the coated article by no more than about 0.2 microns; and
    wherein the substantially conformal coating is hydrophobic, is an outermost layer of the substantially conformal coating so as to be exposed to ambient atmosphere, and is zirconium oxide based and is doped with Ag, Cu, Zn and/or Ti.

2. The method of claim 1, wherein the major surface of the substrate is roughened via etching with an acid.

3. The method of claim 1, wherein the major surface of the substrate is roughened with a laser.

4. The method of claim 1, wherein the substantially conformal coating is deposited via ion beam assisted deposition.

5. The method of claim 1, wherein the substantially conformal coating is deposited via high pressure chemical vapor deposition.

6. The method of claim 1, wherein the substantially conformal coating is deposited via sol gel deposition.

7. The method of claim 1, wherein the substantially conformal coating is super hydrophobic and has a contact angle of at least about 100 degrees, measured via a sessile drop of water.

8. The method of claim 7, wherein the substantially conformal coating has a contact angle of at least about 120 degrees, measured via a sessile drop of water.

9. The method of claim 1, wherein the RMS roughness of the major surface of the coated article is less than or equal to about 0.6 microns.

* * * * *